May 9, 1944.  C. J. WINTER  2,348,669

STRAIGHT EDGE LAWN TRIMMER

Filed March 4, 1943

INVENTOR.

Charley J. Winter

BY Lancaster, Allwine and Rommel

ATTORNEYS.

Patented May 9, 1944

2,348,669

UNITED STATES PATENT OFFICE 2,348,669

STRAIGHT-EDGE LAWN TRIMMER

Charley J. Winter, Altadena, Calif.

Application March 4, 1943, Serial No. 478,047

5 Claims. (Cl. 97—227)

This invention relates to lawn trimmers and more particularly to a straight-edge trimmer.

In so-called edge trimming of lawns, flower beds, terraces and the like, it is generally desirable to remove a ribbon of turf where lawn and sidewalk, flower bed and lawn or sidewalk and terrace meet. In the first two operations, trimmers have been provided, having spade-like blades adapted to be forced downwardly into the turf, and second blades, pivotally or otherwise associated therewith, adapted to descend, in an arc, to meet the first-named blades, and thus cut out a section of turf. But trimmers of this kind are not generally adapted to remove the grassy edge along a terrace or bank, where it joins a walk. Here it is necessary to insert the spade-like blade almost horizontally, instead of vertically, and frequently it is desirable not to remove much soil but, instead, trim the grass edge. An important object of this invention is to provide a trimmer adapted to so trim a terrace or bank, as well as a trimmer adapted to trim the edges of lawns.

Since this novel trimmer is adapted to have one of its blades inserted substantially horizontally, it is also an object of the invention to provide a lawn trimmer which may be employed to quickly remove the grass overlying or overhanging a walk along a lawn, without removing any soil.

Another object is to provide a lawn trimmer having a spade-like blade, with a straight rear edge, to either side of a handle portion, so that the trimmer may be inserted like a spade, that is, one foot may be placed upon this rear edge, in order to force the blade into the turf. It has been discovered that persons who work with gardening or lawn trimming tools appear to prefer new tools which operate somewhat like conventional tools, and the natural method of bearing down with the foot upon the rearward edge of a garden spade or fork may be carried out in using this improved trimmer.

Still another important object is to provide a lawn trimmer having removable cutters for grinding or replacement, and means for compensating for wear and grinding of the cutters.

Another object is to provide a lawn edge trimmer, with a movable blade considerably less in length than its associated stationary blade, disposed above the latter, and spaced a distance from its pivotal connection with the stationary blade, whereby, the movable blade does not interfere with the vision of the user, in gauging depth of trim.

Yet another object is to provide a turf trimmer which is adapted to cut a straight ribbon or section of turf and retain the ribbon or section when the trimmer is removed from the cut.

Other objects and advantages of the invention will appear during the course of the following description of the invention, taken in connection with the accompanying drawing, and in which drawing Figure 1 is a perspective view of the novel lawn trimmer.

Figure 1:
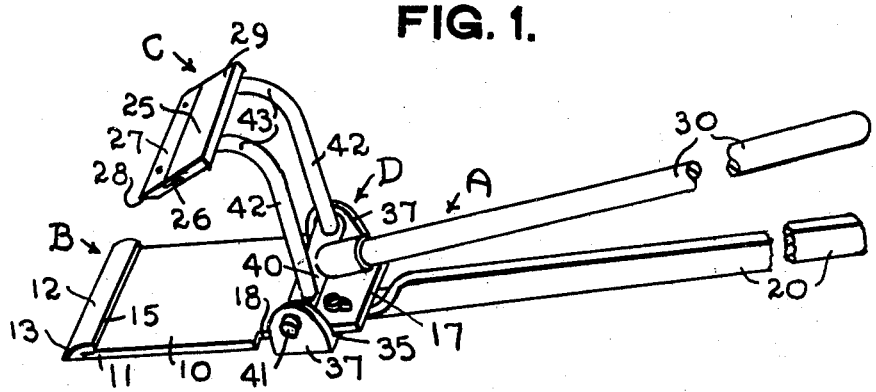

In the drawing, wherein for the purpose of illustration is shown a preferred embodiment of the invention and wherein similar reference characters designate corresponding parts throughout the several views, the letter A may designate the novel lawn trimmer, B the stationary blade and handle portions thereof, C the movable blade and handle portions thereof and D means pivoting the blade portions together and allowing for adjustment of the movable blade longitudinally of the stationary blade.

Figure 2:
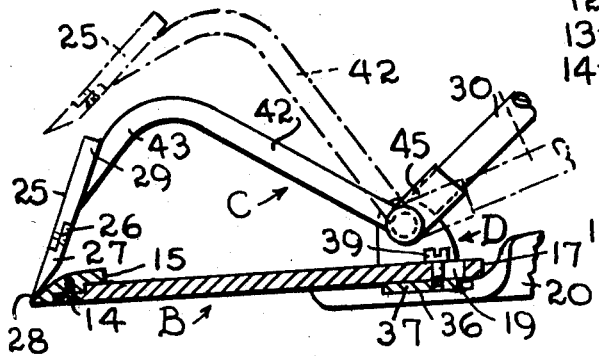
Figure 2 is a fragmentary side elevation, with some parts in section in order to better illustrate the construction, of the trimmer.
Figure 3:
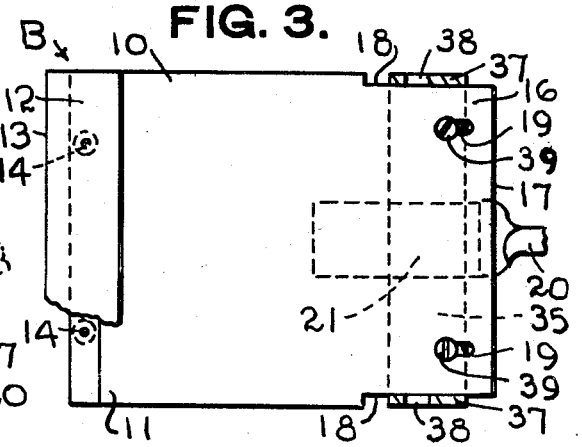
Figure 3 is a top plan of the stationary blade of the new trimmer.
Figure 5:
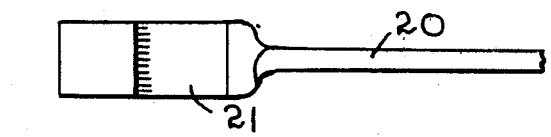
Figure 5 is a top plan of a portion of one handle of the trimmer.
Figure 6:
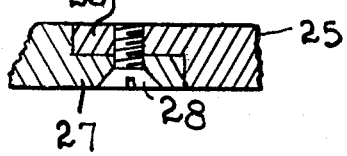
Figure 6 is a fragmentary vertical section through the movable blade and its cutter.
Figure 7:
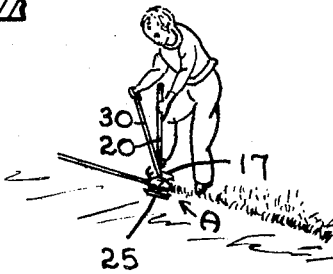

The stationary blade and handle portions B shown particularly in Figures 2 and 3 include a substantially flat, elongated spade-like blade 10, having a forward end or portion 11, which is provided with a cutting member 12 having a cutting edge 13, with the cutting member 12 preferably detachable, so it may be of tempered metal and easily removed for grinding. This end 11 and cutting member 12 may be firmly coupled together as by a suitable number of screws 14. It will be noted, in Figure 2, that the cutting member 12 preferably extends upwardly, beyond the upper face of the blade 10, providing a shoulder for a purpose later described.

At the rearward end or portion 16 of the blade 10, there is a straight, flat edge 17, and this end 16 is slightly reduced in width as at 18. In addition, this end 16 may be provided with a pair of spaced apart slots 19, extending longitudinally of the blade 10.

A suitable handle portion 20 is provided for the blade 10 and this extends rearwardly of the blade. This handle portion may be secured to the blade 10 in any approved way, as by welding or bolting and it will be noted in Figure 2 that it extends only slightly below the blade and is provided with a transverse depression or recess 21, disposed beneath the blade 10, for a purpose to be described later. All of this handle portion 20 is disposed mostly above the plane of the bottom face of the blade 10.

The movable blade and handle portions C include a flat movable blade 25 which is preferably much less in length than the elongated stationary blade 10. In the preferred example shown, the blade 25 is about ⅓ the length of the blade 10. The blade 25 has a forward end or portion 26, which is provided with a detachable cutting member 27 having a cutting edge 28 which cooperates with the cutting member 12 and its cutting edge 13, to sever grass, weeds, turf and the like. This cutting member 27 may be detachably coupled to the end 26 in any approved way, as by screws 28, so that it may be removed for sharpening and replacement and is, preferably of suitably tempered metal. The rearward blade 25 has an end or portion 29.

A handle portion 30 is provided for the blade portion 25 and extends rearwardly of the portion 25 is not secured directly to the portion 25 but is operatively connected therewith and is disposed above the handle portion 20.

Pivot means D operatively connecting the blades 10 and 25 together, as well as providing means for forward and rearward adjustment of the movable blade with respect to the stationary blade, is provided. This combined means includes a carriage 35, having a plate portion 36 extending transversely across the under or bottom side of the stationary blade 10 at the rearward end thereof. This carriage 35 is provided with a pair of upstanding ears 37 at the ends of the blade portion 36, having perforations 38 thus providing bearings to accommodate a pivot to be described, and these ears extend along the reduced portion of the rearward end 18, as shown in Figure 3. This plate portion 36 may be provided with screw-threaded perforations or sockets, aligning with the slots 19, so that, when the plate portion 36 is disposed within and transversely of the depression 21, suitable set screws 39, with portions of their shanks extending through the slots 19, with their screw threaded portions in the screw threaded sockets of the plate portion 36, and with their heads bearing against the top or upper face of the blade 10, may be employed to retain the carriage 35 in longitudinally adjusted positions with respect to the blade 10.

A suitable pivot or pin 40 is provided, with its ends 41 journalled in the perforations 38 of the ears 37.

Extending from the pivot 40 is preferably, a pair of spaced-apart arms 42, preferably J shaped with their curved ends 43 suitably secured to the rearward end 29 of the movable blade 25. Since the blade 25 is relatively narrow, and the pivot 40 is set at the rearward end of the elongated stationary blade 10, there is a considerable open space between the movable blade 25 and the rearward end of the blade 10. With this construction, the manipulator of the novel trimmer has a very clear view of what he is doing while operating the trimmer. This is aided also by the position of the movable blade 25 in its various positions, two of which are shown in full lines and in dots-and-dashes in Figure 2. That is, the J-shape of the arms 42 enables the blade 25 to be secured thereto at an angle with respect to the blade 10, while less than a right angle is an acute angle just slightly less than a right angle.

Figure 4:
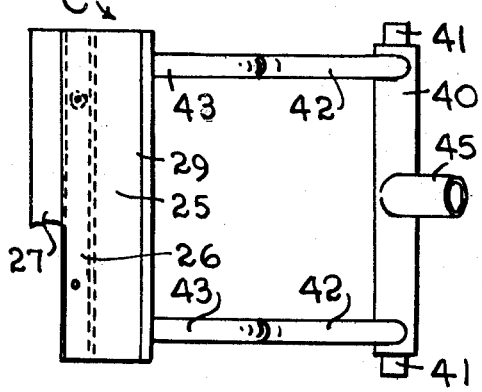
Figure 4 is a top plan of the movable blade of the new trimmer.
Figure 8:
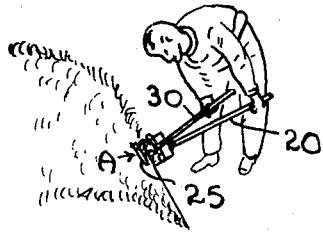
Figures 7 and 8 are perspective views showing the novel trimmer in use.

Midway the length of the pivot 40 is means to secure the handle portion 30 thereto. This may be a socketed member 45 into the socket of which the handle portion 30 fits. The relationship of this member 45 to the arms 42 is shown in Figures 2 and 4.

In use, as an edger at the juncture of a walk and lawn the novel trimmer A may be employed to cut and remove a section of turf, by inserting the blade 10 vertically or nearly so, bearing down upon the flat edge 17 of the blade 10, to either side of the handle portion 20, and guiding the blade by means of that handle grasped by one hand. When the blade 10 is inserted, moving the handle 30 away from the handle 20, will cause the movable blade 25 to swing or pivot until its cutting edge contacts the cutting edge of the blade 10. Now, by drawing the trimmer upwardly, the severed turf will come away, leaving a depression between the walk and lawn and the severed turf will be retained by the trimmer, as is now apparent, and aided by the shoulder 15. Upon moving the blade 25 away from the blade 10, the severed turf may be dropped into a suitable receptacle.

If it is not desired to remove a ribbon of turf along a lawn and walk, but simply to remove grass overhanging or overlying the walk, the trimmer may be positioned more horizontally and the forward end of the blade 10 slide along the walk and beneath the over-lying grass. Now by moving the handle 30, the blade 25 will descend and clip off the overlying grass.

Since it is not desirable to remove much turf at the juncture of a terrace and walk the trimmer may be manipulated as last above, but the blade 10 may be inserted slightly into the turf, so that only a small portion thereof will be removed.

Since there are no projections of any consequence below the blade 10, the trimmer may be manipulated in a substantially horizontal position, and because the blade 25 does not interfere to any extent with the vision of the manipulator who may gauge the depth of cut and other factors connected with lawn trimming.

Various changes may be made to the form of the invention herein shown and described, without departing from the spirit of the invention and scope of the following claims.

What is claimed is:

1. In a straight edge grass trimmer for lawns, terraces and banks, said trimmer being adapted to be operated in a substantially horizontal position, a flat elongated spade-like blade having a forward cutting edge and a rearward edge, a handle extending rearwardly from said rearward edge, a second blade disposed wholly above said first blade and having a forward cutting edge; pivot means connecting said second blade to said first blade so that said second blade may be swung to bring said cutting edges together, including a pivot; arms extending from said pivot to said second blade and bearings for said pivot all wholly above said first blade and adjacent said rearward edge thereof; and a handle secured to said pivot means and extending rearwardly therefrom and above said first handle.

2. In a turf trimmer, a spade-like blade having a forward cutting end and a substantially straight flattened rearward edge, a second blade having a forward cutting end, means pivoting said second blade to said first blade so said second blade may be swung to bring said forward ends into contact, including a pivot extending across said first-named blade, means for retaining said pivot in various longitudinally adjusted positions with respect to said first named blade, a handle carried by said pivot and a handle carried by said first-named blade at said rearward edge and at substantially the longitudinal medial line of said first-named blade, both of said handles extending rearwardly of said blades.

3. In a turf trimmer, a spade-like blade having a forward cutting end and a substantially straight flattened rearward edge, a second blade having a forward cutting end, means pivoting said second blade to said first blade so said second blade may be swung to bring said forward ends into contact, including a pivot extending across said first-named blade, means for selectively retaining said pivot in various positions with its longitudinal axis normal to the longitudinal axis of said first named blade, a handle carried by said pivot and a handle carried by said first-named blade at said rearward edge and at substantially the longitudinal medial line of said first-named blade, both of said handles extending rearwardly of said blades, said pivot being, at all times, inwardly of the plane of said flattened rearward edge.

4. In a lawn trimmer, a stationary spade-like blade portion having a forward cutting end and a rearward end, a movable blade, having a forward cutting end and a rearward end; and means pivoting said movable blade to said stationary blade portion so that said movable blade may be pivoted to bring said forward ends into contact, including a carriage having a plate portion extending across said stationary blade at the rearward end thereof, with said carriage being provided with spaced apart upstanding bearing members, a pivot extending from bearing to bearing and an arm carried by said pivot and operatively connected with said movable blade at the rearward end thereof, one of said portions being provided with a slot extending longitudinally of said trimmer, and the other of said portions being provided with a set screw with the shank thereof extending through said slot, whereby said carriage may be set at varying distances longitudinally of said stationary blade portion.

5. In a lawn trimmer, a stationary spade-like blade having a forward cutting end and a rearward end with said rearward end reduced in width and provided with a slot extending longitudinally of said stationary blade; a movable blade having a forward cutting end and a rearward end; and means pivoting said movable blade to said stationary blade so that said movable blade may be swung to bring said forward ends into contact, including a carriage provided with a plate extending transversely across the underside of said stationary blade at the rearward end thereof, said carriage having an upstanding perforated ear at each end of said plate with said ears extending along the sides of said stationary blade at the reduced portion thereof, a pivot pin journalled in said perforations, a forwardly-extending arm carried by said pin and secured to the rearward end of said movable blade, and a set screw with its head bearing upon the upper face of said stationary blade, a portion of its shank in said slot and its screw threaded end operatively connected with said plate.

CHARLEY J. WINTER.